US006484091B2

(12) United States Patent
Shibata et al.

(10) Patent No.: US 6,484,091 B2
(45) Date of Patent: Nov. 19, 2002

(54) ON-VEHICLE VEHICLE GUIDE APPARATUS, COMMUNICATION SERVER SYSTEM, AND SUBSTITUTE VEHICLE GUIDE SYSTEM

(75) Inventors: Makoto Shibata, Saga (JP); Nobuyuki Moribe, Fukuoka (JP); Tomonari Yamaguchi, Fukuoka (JP)

(73) Assignee: Fujitsu Limited, Kawaski (JP)

( * ) Notice: Subject to any disclaimer, the term of this patent is extended or adjusted under 35 U.S.C. 154(b) by 0 days.

(21) Appl. No.: 09/875,920

(22) Filed: Jun. 8, 2001

(65) Prior Publication Data

US 2002/0026281 A1 Feb. 28, 2002

Related U.S. Application Data

(63) Continuation of application No. PCT/JP99/06836, filed on Dec. 7, 1999.

(30) Foreign Application Priority Data

Dec. 9, 1998 (JP) .......................................... 10-350059

(51) Int. Cl.[7] ......................... G01K 21/24; G08G 1/137

(52) U.S. Cl. ....................... 701/208; 701/211; 340/995; 340/438; 455/456

(58) Field of Search ................................ 701/208, 201, 701/210, 211; 455/456, 507, 517, 521; 340/990, 995, 438

(56) References Cited

FOREIGN PATENT DOCUMENTS

| | | |
|---|---|---|
| EP | 0 438 521 | 7/1991 |
| JP | 9-167299 | 6/1997 |
| JP | 10-006846 | 1/1998 |
| JP | 10-302197 | 11/1998 |
| JP | 10-307984 | 11/1998 |

*Primary Examiner*—Tan Nguyen
(74) *Attorney, Agent, or Firm*—Staas & Halsey LLP

(57) ABSTRACT

There is provided an alternative vehicle guiding system wherein a communication sever system receives a fault condition information from vehicles and also transmits the necessary information to the navigation system of an alternative vehicle in order to prevent the damage of loads by quickly guiding the alternative vehicle to the fault generating vehicle position and then realizing smooth transfer of remaining work to the alternative vehicle. The navigation system, fault monitoring means and vehicle communication means are respectively provided in the vehicles for transportation work and the center server system is also provided to transmit the vehicle distribution information to the vehicles. When a fault is generated in the vehicle, the communication server system receives the information from this vehicle and the navigation system of the alternative vehicle displays the transmitted information. Thereby, the alternative vehicle can always be distributed smoothly without any manual operation, the time required until the alternative vehicle arrives and the work transfer time can be shortened and adverse effect on the loads and successive load distribution work can be prevented.

8 Claims, 10 Drawing Sheets

FIG. 4

| VEHICLE CODE | TRANSPORTATION SEQUENCE | CUSTOMER NAME | LATITUDE OF CUSTOMER | LONGITUDE OF CUSTOMER | ESTIMATED SHOP ARRIVING TIME | EXTERNAL SHAPE OF LOAD | QUANTITY |
|---|---|---|---|---|---|---|---|
| 10000001 | 001 | | NORTH LATITUDE 35 | EAST LONGITUDE 140 | 10:00 | CARGO | 2 |
| 10000001 | 002 | | NORTH LATITUDE 35 | EAST LONGITUDE 140 | 10:30 | CARGO | 1 |
| : | : | : | : | : | : | : | : |
| 10000001 | 006 | | NORTH LATITUDE 35 | EAST LONGITUDE 139 | 14:30 | PALLET | 3 |
| | | | | | | | |
| 10000002 | 001 | | NORTH LATITUDE 35 | EAST LONGITUDE 140 | 10:00 | PALLET | 2 |
| 10000002 | 002 | | NORTH LATITUDE 35 | EAST LONGITUDE 139 | 10:20 | CARGO | 1 |
| : | : | : | : | : | : | : | : |
| 10000002 | 007 | | NORTH LATITUDE 35 | EAST LONGITUDE 140 | 15:00 | PALLET | 3 |
| : | : | : | : | : | : | : | : |
| | | | | | | | |
| 10000025 | 001 | | NORTH LATITUDE 35 | EAST LONGITUDE 139 | 09:30 | CARGO | 1 |
| 10000025 | 002 | | NORTH LATITUDE 35 | EAST LONGITUDE 139 | 10:20 | PALLET | 2 |
| : | : | : | : | : | : | : | : |
| 10000025 | 006 | | NORTH LATITUDE 35 | EAST LONGITUDE 139 | 15:10 | CARGO | 2 |

FIG. 5

| VEHICLE CODE | WORK | DAY AND TIME | LATITUDE | LONGITUDE | ACCUMULATED RUNNING DISTANCE | EXTERNAL SHAPE OF LOAD | QUANTITY |
|---|---|---|---|---|---|---|---|
| 10000001 | | 11/30 9:30 | NORTH LATITUDE 35 | EAST LONGITUDE 140 | 108520 | | |
| 10000001 | | 11/30 10:00 | NORTH LATITUDE 35 | EAST LONGITUDE 140 | 108536 | CARGO | 2 |
| 10000001 | | 11/30 10:10 | NORTH LATITUDE 35 | EAST LONGITUDE 140 | 108536 | | |
| 10000001 | | 11/30 10:35 | NORTH LATITUDE 35 | EAST LONGITUDE 140 | 108550 | CARGO | 1 |
| 10000001 | | 11/30 10:45 | NORTH LATITUDE 35 | EAST LONGITUDE 140 | 108550 | | |
| : | : | : | : | : | : | : | : |
| 10000001 | | 11/30 12:30 | NORTH LATITUDE 35 | EAST LONGITUDE 140 | 108586 | CARGO | 3 |
| 10000001 | | 11/30 13:00 | NORTH LATITUDE 35 | EAST LONGITUDE 140 | 108586 | | |

FIG. 6

| VEHICLE CODE | CONTENT OF FAULT | LATITUDE OF FAULT DETECTION POINT | LONGITUDE OF FAULT DETECTION POINT | ... | DETECTION TIME |
|---|---|---|---|---|---|
| 10000004 | TEMPERATURE RISE IN THE LOADING ROOM | NORTH LATITUDE 35 | EAST LONGITUDE 140 | ... | 10:08 |

FIG. 8

| VEHICLE CODE | TRANSPORTATION SEQUENCE | CUSTOMER | ESTIMATED SHOP ARRIVING TIME |
|---|---|---|---|
| 10000003 | 001 | | 10:00 |
| 10000003 | 002 | | 10:30 |
| 10000003 | 003 | | 10:50 |
| : | : | : | : |
| 10000003 | 006 | | 14:30 |

| VEHICLE CODE | TRANSPORTATION SEQUENCE | CUSTOMER | ESTIMATED SHOP ARRIVING TIME |
|---|---|---|---|
| 10000004 | 001 | | 10:00 |
| 10000004 | 002 | | 10:20 |
| 10000004 | 003 | | 10:55 |
| : | : | : | : |
| 10000004 | 007 | | 15:00 |

| VEHICLE CODE | TRANSPORTATION SEQUENCE | CUSTOMER | ESTIMATED SHOP ARRIVING TIME |
|---|---|---|---|
| 10000003 | 002 | | 10:45 |
| 10000003 | 003 | | 10:55 |
| 10000003 | 004 | | 11:15 |
| 10000003 | 005 | | 11:30 |
| : | : | : | : |
| 10000003 | 011 | | 15:45 |
| 10000003 | 012 | | 16:30 |

--- A LOADING ROOM FAULT IS ---
GENERATED IN THE VEHICLE NO. 4
URGENTLY REQUEST DISTRIBUTION
--- OF THE ALTERNATIVE VEHICLE ---

SITE: ROTARY IN FRONT OF ICU, JINDAIJI-MITAKA-CITY

EXTERNAL SHAPE OF LOAD: COOL M BOX X 8
(COOLING IS NECESSARY)

FAULT CONTENT: TEMPERATURE RISE OF LOADING ROOM

DISTANCE: 1.3 km

---SUCCESSIVELY REQUEST THE WORKING---

WORK NO.: NO. 3 (ALTERNATIVE WORK)

DESTINATION: 181-0013
2-13-1 SHIMORENJAKU-MITAKA
SIX-TEN MITAKA-CHUO SHOP

TELEPHONE: 0422-31-0000

LOAD: COOLING BOX X 4 (COOLING IS NECESSARY)

REFERENCE DISTANCE: 2.1 km

ON-VEHICLE VEHICLE GUIDE APPARATUS, COMMUNICATION SERVER SYSTEM, AND SUBSTITUTE VEHICLE GUIDE SYSTEM

This application is a continuing application filed under 35 U.S.C. §111(a), based upon International Application PCT/JP99/06836 filed Dec. 7, 1999, it being further noted that priority is based on Japanese Patent Application Number 10-350059, filed Dec. 9, 1998.

BACKGROUND OF THE INVENTION

1. Field of the Invention

The present invention relates to a mobile-type vehicle guiding apparatus for guiding a moving vehicle to the destination and detecting a failure condition within a loading room, a communication server system for giving information such as the destination or the like to the vehicle and an alternative vehicle guiding system for guiding smoothly and quickly, utilizing these apparatus and system explained above, an alternative vehicle to the failure generating vehicle position if a failure is generated in the loading room of the vehicle and safe-keeping of load can no longer be maintained during the transportation work and then assuring quick transfer of the remaining work of the failure generating vehicle to the alternative vehicle.

2. Description of the Related Art

In recent years, a navigation system for accurately guiding a vehicle within a short period to the destination by displaying, during the running of vehicle, the position information and route information up to the destination to a driver of vehicle has been mounted to a transportation vehicle used in the transportation business for collecting and distributing the loads in order to accurately collect and distribute the loads within a short period of time even if a driver is not well informed with the geographical features of the area in charge.

In this navigation system, the current position information of the vehicle mounting this system is obtained mainly using GPS (Global Positioning System) as the measuring means to measure the current position of the vehicle, this position information is collated with the map information stored in a storage device as the map database within the vehicle and the map of the predetermined range in the periphery of the current position is displayed on the display area and the current position of the vehicle is displayed on this map. When the position information of the destination (latitude and longitude) is inputted as required from an operation terminal, this position information of the destination is collated with the map database and the route information up to the destination is displayed on the map. When a driver previously inputs the position information of the destination with hands or voices, the current position is detected with the navigation system while the vehicle is running and the map in which the route to the destination is indicated is displayed on the display area in view of guiding the vehicle to the destination.

In addition to this navigation system, a fault monitoring means has often been mounted to the existing vehicle for transportation business in order to detect a fault condition in t he loading room utilizing various sensors and notifying the detected fault condition to a driver. In this case, an adequate measure for damage of loads can be taken by quickly notifying, to a driver, such fault condition in the loading room of vehicle with the fault monitoring means.

Moreover, in the transportation business, a vehicle distribution system has also been introduced in which a manager performs, in the vehicle distribution base which is linked with a plurality of vehicle for transportation with a radio (wireless) communication link, the distribution work (vehicle distribution) to adequately assign many load collecting and distributing points and load items to be collected and distributed to each vehicle, departing/arriving relaying points of each vehicle based on such distribution work and instructing information such as contents of transportation are transmitted as the voice or facsimile information to a plurality of vehicles via the radio communication link from the vehicle distribution base explained above in order to notify the information to a driver of each vehicle and thereby each vehicle can efficiently perform the transportation work. In this vehicle distribution system, the vehicle distribution base receives the information such as current position or the like from a driver of each vehicle as the voice or facsimile information via the radio communication link and thereby can roughly detect the current positions of a plurality of vehicles and working conditions thereof. Moreover, a system has also be established in which if a fault is generated in the loading room of the vehicle mounting the fault monitoring means and a driver knows generation of fault with the fault monitoring means, a driver makes contact with the vehicle distribution base using a radio system or a telephone or the like and a manager searches in the vehicle distribution base an alternative vehicle through a vehicle distribution system and instructs the alternative vehicle to go to the position of the fault generating vehicle in order to succeed the work.

Since the existing vehicle for transportation and vehicle distribution system have been structured as explained above, if a fault is generated in the loading room of any vehicle, only a driver can know the fault condition through fault detection with the fault monitoring means. In this case, after a driver has detected the fault condition, a driver is requested to execute the work to make contact with the vehicle distribution base and then request distribution of an alternative vehicle from the vehicle distribution base through the vehicle distribution system. Accordingly, the existing system explained above has a problem that a considerable time is required until an alternative vehicle arrives and a certain influence is generated in some cases in the loads.

Moreover, when the navigation system is mounted in the vehicle, if the current position information of the fault generating vehicle is sent to an alternative vehicle with the vehicle distribution system after an alternative vehicle is determined, the information input operation to the navigation system by a driver in the vehicle side is required and moreover the alternative vehicle acquires for the first time the information required for succession of work such as the remaining relaying points and destination or the like from the fault generating vehicle when it arrives at the fault generating vehicle position through the guidance by the navigation system. Therefore, the work for inputting again such information to the navigation system of the alternative vehicle with the driver's operation is also required together with the transfer of the loads, resulting in the problem that amount of work of a driver of the alternative vehicle increases to enhance the sharing of the driver giving a certain influence on the successive transportation work.

DISCLOSURE OF THE INVENTION

The present invention has been proposed to overcome the problems explained above and an object of the present invention is to provide a mobile-type vehicle guiding apparatus for guiding a moving vehicle to the destination by displaying the route to the destination to a driver and for detecting a fault condition in the loading room, a communication server system for transmitting information, such as destination or the like to the vehicle based on the vehicle destination information and an alternative vehicle guiding system with which the communication server system automatically receives a fault condition information from a fault generating vehicle and automatically sends, without any information input operation by a driver, the information such as a fault generating vehicle position or the like to the navigation system of the vehicle as an alternative vehicle in order to prevent damage of loads by smoothly and quickly guiding the alternative vehicle to the current position of the fault generating vehicle and to efficiently and quickly continue the remaining distribution work of the fault generating vehicle with the alternative vehicle.

In order to attain the object explained above, the mobile-type vehicle guiding apparatus of the present invention comprises a navigation system comprising a measuring means for obtaining the current position, a map database storing the map information and a display area that can display characters and video information and assures visual recognition of a driver for displaying the current position of the vehicle on the display area together with the map of peripheral areas by collating the current position information obtained from the measuring means with the map information of the map database, a fault monitoring means for notifying a fault condition information to a driver with an audio output and/or the predetermined display that may be visually recognized with a driver by detecting the fault condition in the loading room of the vehicle and a vehicle communication means for receiving information transmitted from external side through the radio communication link and also transmitting, to the external side, the information obtained in the vehicle side including the current position information of the vehicle obtained with the measuring means of the navigation system and the fault condition information of vehicle obtained with the fault monitoring means with the radio communication link at least when a fault condition is generated, whereby at least the destination position information received with the vehicle communication means is collated with the map information of the map database and the route information up to the destination from the current position of vehicle is displayed on the display area.

As explained above, in the present invention, a navigation system for obtaining the current position of a vehicle to display it together with the map of the peripheral area, a fault monitoring means for detecting a fault condition in the loading room and then notifying it to a driver and a vehicle communication means for receiving an external information and then transmitting, to the external side, the current position information obtained from the navigation system when a fault is generated and the fault condition information obtained from the fault monitoring means are mounted in the vehicle and thereby when the vehicle communication means receives from the external side the position information of relaying point and destination position, the navigation system automatically obtains each information and displays a new route information up to the destination. Thereby, a driver can smoothly drive the vehicle to the destination and if a fault is generated in the loading room, a driver can quickly detect the fault in the loading room and can immediately take a proper measure.

Moreover, the communication server system of the present invention has a function to issue the work instructions by transmitting, to the vehicle communication means of each vehicle, the information of relaying points and destination of transportation, through the radio communication link, for a plurality vehicles for transportation based on the preset vehicle distribution information, wherein an information obtained in the vehicle side including the fault condition information is suddenly received from any vehicle after the position information of relaying point and destination for transportation based on the vehicle distribution information is transmitted as the initial value to a plurality of vehicles, if it is determined that the relevant vehicle cannot eliminate a fault condition, the current position of the fault generating vehicle and the relaying point and destination at which a fault generating vehicle does not arrive that are assigned to the fault generating vehicle are additionally assigned as the relaying point and/or destination of the other predetermined vehicle, and the position information of the relaying point and/or destination to be added are transmitted to the vehicle communication means of predetermined vehicle through the radio communication link.

In such present invention, as explained above, the communication server system as the vehicle distribution base for transmitting the vehicle distribution information to a plurality of vehicles receives, when any vehicle has generated a fault in the loading room, the fault condition information from this vehicle, determines an alternative vehicle from the other vehicles if a fault is generated in the loading room of any vehicle, determines the alternative vehicle from the other vehicles when an alternative vehicle is determined necessary and the fault generating vehicle position and relaying point and destination after the fault generating vehicle position assigned to the fault generating vehicle are transmitted to the alternative vehicle as the additional information of the vehicle distribution. Thereby, alternative vehicle management procedures by a vehicle distribution manager can be eliminated, vehicle distribution can be made smoothly, time required until arrival of alternative vehicle can be shortened and adverse effect on the load can also be reduced.

Moreover, in the alternative vehicle guiding system of the present invention, the communication server system explained above receives the information acquired in the vehicle side including the fault condition information from the vehicle in which a fault is generated in the loading room through the radio communication link and transmits the fault generating vehicle position information and position information of relaying point and destination assigned to the fault generating vehicle and at which the fault generating vehicle does not arrive to the vehicle communication means of the other predetermined vehicle through the radio communication link and the navigation system of the predetermined vehicle explained above acquires the position information of relaying point and destination from the communication server system, collates the relevant position information with the map information of map database and displays the route information up to the current position of vehicle on the display area.

As explained above, in the present invention, the navigation system for obtaining the current position of vehicle and displays the position with the map of the peripheral area, fault monitoring means for detecting the fault condition in the loading room of vehicle and then notifying such fault condition to a driver and vehicle communication means for receiving information from external side and transmitting the current position information obtained from the navigation system when a fault condition is generated and the fault condition information obtained with the fault monitoring means to the external side are respectively provided in a plurality of vehicles for transportation, and the communication server system is provided as the vehicle distribution base to transmit the vehicle distribution information to each vehicle, and the communication server system receives a fault condition information from a vehicle when a fault is generated in the loading room of any vehicle, determines an alternative vehicle from another vehicle or a plurality of vehicles when an alternative vehicle is determined necessary, transmits the fault generating vehicle position and the relaying point and destination after the fault generating vehicle position assigned to the fault generating vehicle to the alternative vehicle as the additional information of vehicle distribution, thereby the navigation system automatically acquires such information and displays a new route information up to the destination and the procedures required for a driver to notify the fault condition, the procedures required for vehicle distribution manager to distribute the alternative vehicle, the procedures required for a driver of alternative vehicle to input the current position information of the fault generating vehicle to the navigation system can be eliminated, the time required until the alternative vehicle arrives can be shortened, adverse effect on the load can be prevented, man-power required for procedures from fault notification to guiding of alternative vehicle can be saved and the alternative vehicle can always be distributed smoothly in night and day without any manual operations. Moreover, input operations to the navigation system of a driver is no longer required even after the alternative vehicle arrives, a load of the driver of alternative vehicle can be reduced, the time required until transfer of transportation work to the alternative vehicle can drastically shortened and adverse effect on the successive transportation work can be reduced.

Moreover, the alternative vehicle guiding system of the present invention searches as required, when the communication server system receives a fault condition information from any vehicle and is requested to distribute a vehicle in place of the fault generating vehicle by suddenly receiving the fault condition information from any vehicle, the route passing the position of the fault generating vehicle and not yet passing relaying point and destination assigned to the fault generating vehicle from the current position of each vehicle other than the fault generating vehicle and adds the fault generating vehicle position and not yet passing relaying point and destination assigned to the fault generating vehicle to the predetermined vehicle to realize the optimum route among a plurality of vehicles as the new relaying and/or destination of the predetermined vehicle. As explained above, in the present invention, when sudden fault condition information is inputted to the communication server system, the communication server system searches a route passing the fault generating vehicle position and not yet passing relaying point and destination assigned to the fault generating vehicle from the current positions of a plurality of vehicles, guides a vehicle that may realize the optimum route and transmits the position information in addition to such vehicle. Thereby, if a fault is generated in any vehicle, a vehicle that can pass the fault generating vehicle position and remaining relaying points and destination without large deviation from the route based on the initial value within the shortest time can be selected. Accordingly, an alternative vehicle can be moved to the fault generating vehicle position within a shorter period to surely maintain the quality of load, the transportation work of the alternative vehicle after transfer of work can be progressed smoothly and efficiently and thereby loss due to fault generation can be minimized.

Moreover, in the alternative vehicle guiding system of the present invention, the communication server system searches, as required, a route passing the fault generating vehicle position and not yet passing relaying point and destination assigned to the fault generating vehicle from the current position of each vehicle other than the fault generating vehicle, determines adequacy of a plurality of vehicles for one or a plurality of restricting conditions in relation to the works assigned to the fault generating vehicle, and adds the fault generating vehicle position and not yet passing relaying point and destination assigned to the fault generating vehicle to the predetermined vehicle that satisfies the conditions of work and realize the optimum route as the new relaying point and destination. As explained above, in the present invention, for generation of a fault in any vehicle, the communication server system searches, from the current positions of a plurality of vehicles, the route passing the fault generating vehicle position and not yet passing relaying point and destination assigned to the fault generating vehicle, determines adequacy of each vehicle for the restricting condition in relation to the work assigned to the fault generating vehicle, guides a vehicle that can satisfies the conditions of work and realize the optimum route and transmits the additional position information to this vehicle. Thereby, if a fault is generated in any vehicle, the work can be transferred each time by selecting a vehicle that is most suitable for transfer of work from the fault generating vehicle and assures the highest efficiency. Accordingly, the transportation work of the alternative vehicle after the transfer of work can be progressed smoothly and loss due to generation of fault can be minimized.

Moreover, the alternative vehicle guiding system of the present invention uses, as requires, the mobile telephone network as the radio communication link, distributes a mobile telephone as the vehicle communication means of each vehicle, sets up the line connection by calling the communication server system with the mobile telephone of a relevant vehicle when a fault is generated in the loading room of any vehicle, automatically transmits an information obtained in the vehicle side including the fault condition information to the communication server system, also sets up the line connection by calling the mobile telephone of an alternative vehicle after the communication server system has determined the alternative vehicle and also automatically transmits the position information of the additional relaying point and/or destination. As explained above, the present invention uses the mobile telephone network as the radio communication link, transmits a fault condition information by opening the communication link with the communication server system side from the vehicle side when a fault is generated and also transmits the additional vehicle distribution information by opening the communication link with the alternative vehicle side from the communication server system for the alternative vehicle. Thereby, if a fault is generated, the communication server system side can acquire the fault condition information transmitted without operation such as response or the like by a manager in the communication server system, the vehicle distribution information can be transmitted without waiting for the response of a driver of the alternative vehicle from the communication server system, information can be exchanged smoothly even during the urgent communication by realizing automatic transmission and reception when a fault is generated, management can be eased through the labor-saving even when adequate measure can always be taken and accordingly communication cost can be reduced because necessary information can be transmitted and received when necessary even if the communication link is not always in the connected condition.

Moreover, in the alternative vehicle guiding system of the present invention, the vehicle communication means transmits, as required, an information acquired in the vehicle side including at least the current position information of the vehicle obtained with a measuring means of the navigation system and also a fault condition information of the vehicle obtained with a fault monitoring means when a fault condition is generated to an external side through the radio communication link, and the communication server system receives the information acquired in the vehicle side from the vehicle communication means through the radio communication link to detect the running condition of each vehicle and also waits for the fault condition information from a certain vehicle. In the present invention explained above, the current position information sent from the navigation system is transmitted any time to the communication server system and the communication server system acquires the current position information from each vehicle to accurately detect the position of each vehicle, when an alternative vehicle is therefore required, the communication server system identifies accurately the position of each running vehicle based on the current position information, the vehicle that assures movement to the fault generating vehicle and most efficient transfer of transportation work can be selected correctly as the alternative vehicle and maintaining of quality of the load and smooth transportation work after the transfer can surely be realized.

BRIEF DESCRIPTION OF THE DRAWINGS

FIG. 4 is a vehicle distribution information display image diagram in the communication server system of the alternative vehicle guiding system as an embodiment of the present invention.

FIG. 5 is a vehicle work record information display image diagram in the communication server system of the alternative vehicle guiding system as an embodiment of the present invention.

FIG. 6 is a diagram for explaining contents of transmitting information to the communication server system when a fault condition is generated in a vehicle of the alternative vehicle guiding system as an embodiment of the present invention.

FIG. 8 is a diagram for explaining the urgent vehicle distribution instruction data generating condition for the alternative vehicle in the communication server system of the alternative vehicle guiding system as an embodiment of the present invention.

DESCRIPTION OF THE PREFERRED EMBODIMENTS

Figure 1:
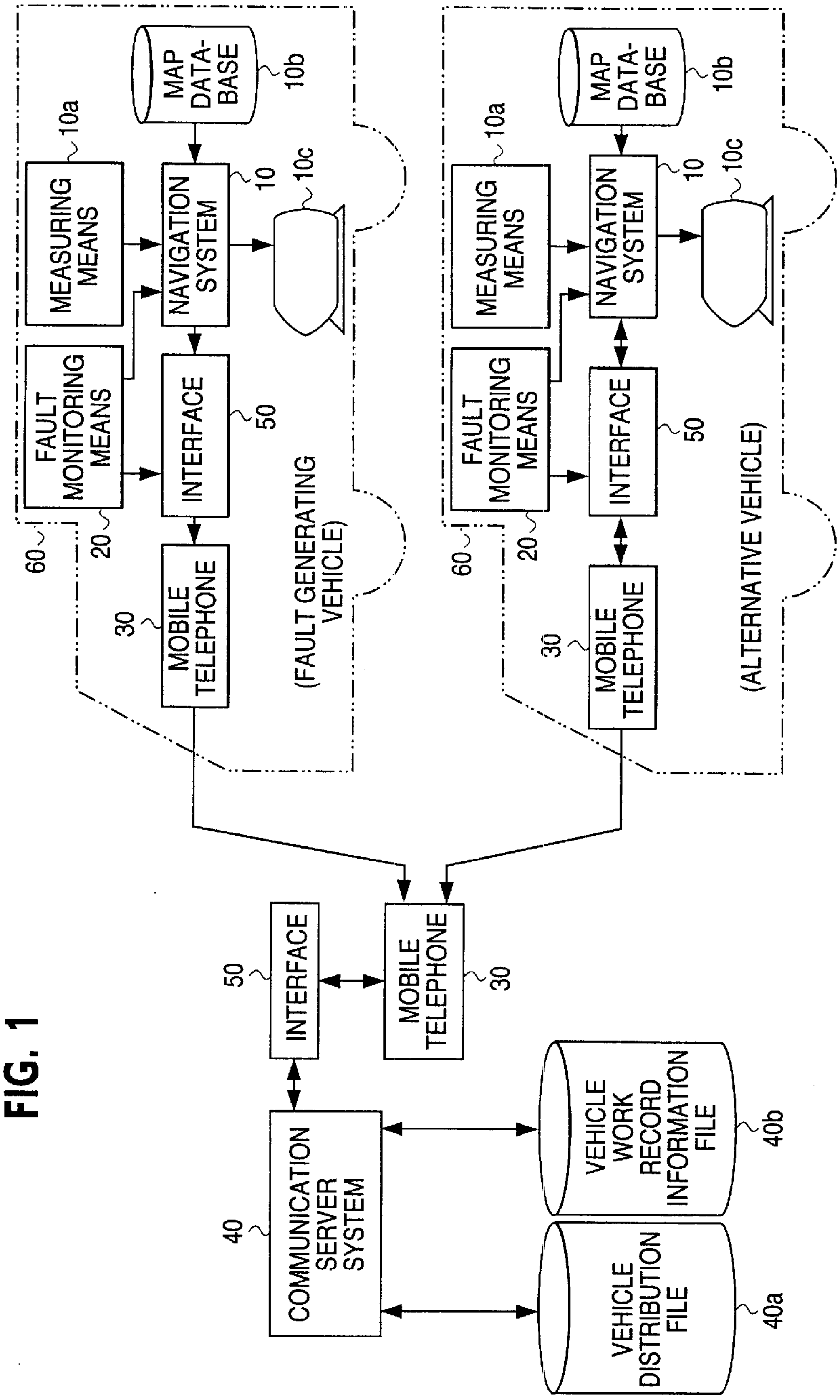
FIG. 1 is a block diagram of an alternative vehicle guiding system as an embodiment of the present invention.
Figure 2:
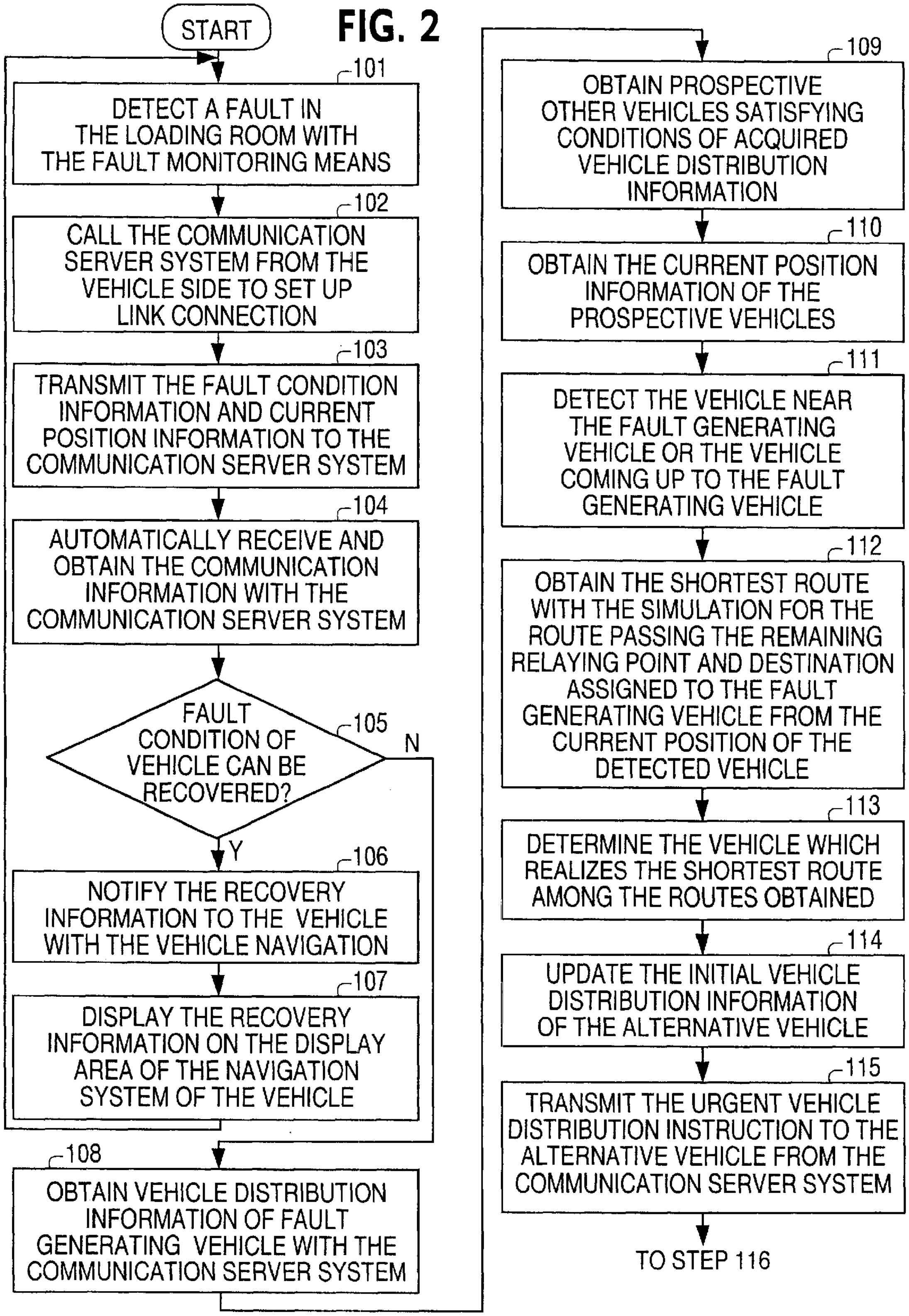
FIG. 2 is a former-half flowchart of the vehicle guiding process of the alternative vehicle guiding system as an embodiment of the present invention.
Figure 3:
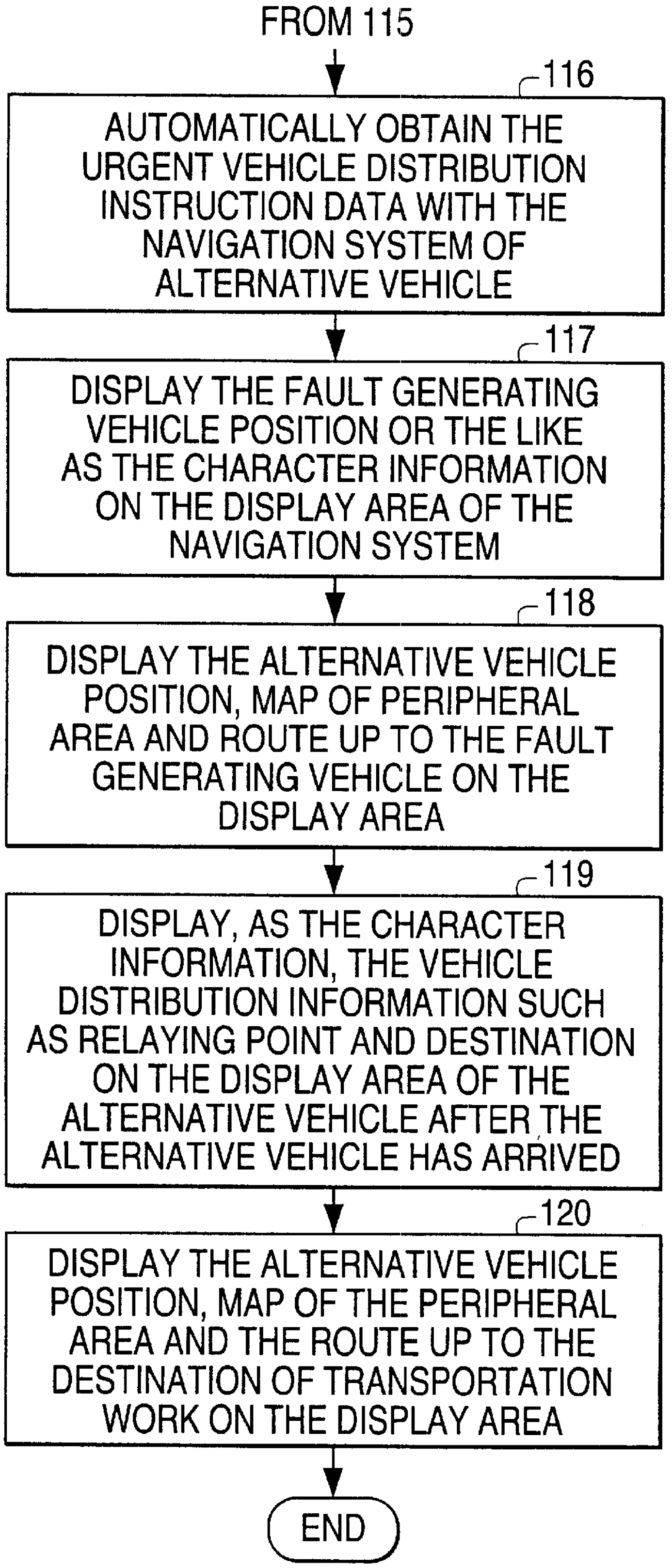
FIG. 3 is a latter-half flowchart of the vehicle guiding process of the alternative vehicle guiding system as an embodiment of the present invention.
Figure 7:
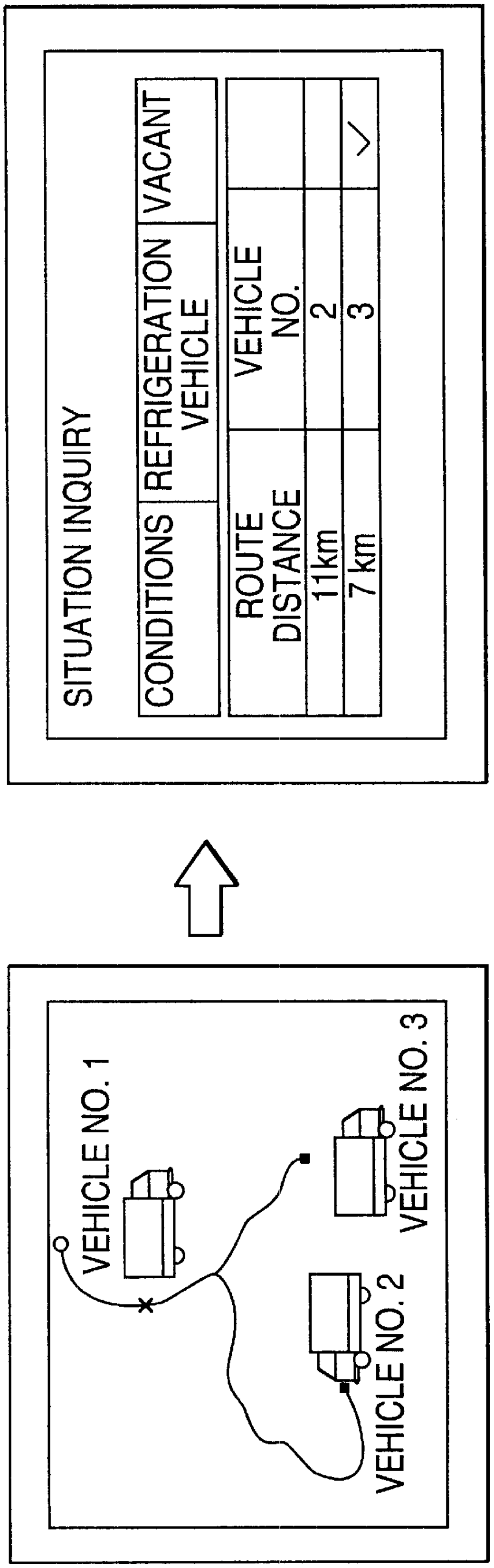
FIG. 7 is a diagram for explaining the alternative vehicle determination process in the communication server system of the alternative vehicle guiding system as an embodiment of the present invention.

A preferred embodiment of the present invention will be explained with reference to FIG. 1 to FIG. 10. FIG. 1 is a block diagram of an alternative vehicle guiding system in relation to this embodiment. FIG. 2 is a former-half flowchart of the vehicle guiding process of the alternative vehicle guiding system in relation to this embodiment. FIG. 3 is a latter-half flowchart of the vehicle guiding process of the alternative vehicle guiding system in relation to this embodiment. FIG. 4 is a vehicle distribution information display image diagram in the communication server system of the alternative vehicle guiding system in relation to this embodiment. FIG. 5 is a vehicle work record information display image diagram in the communication server system of the alternative vehicle guiding system in relation to this embodiment. FIG. 6 is a diagram for explaining the contents of the information transmitted to the communication server system when a fault condition is generated in the vehicle of the alternative vehicle guiding system in relation to this embodiment. FIG. 7 is a diagram for explaining the alternative vehicle determination process in the communication server system of the alternative vehicle guiding system in relation to this embodiment. FIG. 8 is a diagram for explaining urgent vehicle distribution instruction data generating condition for the alternative vehicle in the communication server system of the alternative vehicle guiding system in relation to this embodiment. FIG. 9 is a diagram for explaining character information and map information display condition to the alternative vehicle display area for acquisition of urgent vehicle distribution instruction data of alternative vehicle of the alternative vehicle guiding system in relation to this embodiment. FIG. 10 is a diagram for explaining character information and map information display condition to the alternative vehicle display area for arrival of alternative vehicle at the fault generating position of the alternative vehicle guiding system in relation to this embodiment.

In each figure, the alternative vehicle guiding system in relation to this embodiment has a structure, comprising a navigation system 10 that is respectively mounted to a plurality of vehicles 60 for transportation use, with inclusion of a measuring means 10*a* for measuring the current position, a map database 10*b* for storing a map information and a display area 10*c* that can display the character and video information for visual recognition of a driver in order to display the current position of a vehicle 60 on the display area 10*c* together with the map of the peripheral region by collating the current position information obtained from the measuring means 10*a* with the map information of the map database 10*b*, a fault monitoring means 20 mounted in each vehicle 60 to notify the fault condition information to a driver with the audio output or predetermined display which may be visually recognized with a driver by detecting a fault condition in the loading room, a mobile telephone 30 as the vehicle communication means mounted in each vehicle 60 to transmit the information obtained in the vehicle side to the external side through the mobile telephone network as the radio communication link and to also receive the information transmitted from the external side through the mobile telephone network, and a communication server system 40 for suddenly receiving, while detecting the running conditions of a vehicle 60 by transmitting, as the initial values, the position information of the relaying point and destination of transportation based on the work request respectively assigned previously to each vehicle 60 to the mobile telephone 30 of each vehicle 60 through the mobile telephone network and also always receiving the information obtained in the vehicle side from the mobile telephone 30 through the mobile telephone network, a fault condition information from any vehicle 60 and also transmitting, if it is determined that the relevant vehicle 60 cannot eliminate the fault condition, a fault generating vehicle position and a position information of the relaying point and destination at which the fault generating vehicle does not yet arrive that is assigned to the fault generating vehicle as the additional relaying point and/or destination to the mobile telephone 30 of the other predetermined vehicle 60 through the mobile telephone network.

The navigation system 10 acquires, as in the case of the related art explained above, the current position information of a vehicle 60 using GSP as the measuring means 10*a* for measuring the current position of the vehicle 60, collates this current position information with the map information of the map database 10*b* and displays, on the display area 10*c*, the map of the current position of vehicle 60 and the predetermined range of the peripheral area of the current position and moreover, as the new functions automatically extract various vehicle distribution instruction data including the position information (latitude and longitude) of the destination and relaying point transmitted from the communication server system 40, then collates the position information of the destination and relaying point with the map information and then displays the route up to the destination on the map of the display area 10*c* in order to guide the vehicle. The information transfer function to a driver from this navigation system 10 is composed of the map information display function to display, as the character information, the information such as address, telephone number and route distance or the like of the destination and relaying point on the display area 10*c* and to print such information on a sheet of paper with a printer (not illustrated) provided in the vehicle and a route display function for automatically displaying the route up to the destination from the current position on the map of the display area 10*c* without any operation of a driver after the character information. Here, for the navigation system 10, a driver can input the position information of destination and relaying point manually or with hands as in the case of the related art.

The fault monitoring means 20 has a function to notify a fault condition to a driver by detecting a fault condition in the loading room such as sudden change of temperature in the loading room or generation of the condition to result in a fault condition in the loading room such as stop of air conditioner operation and opening of doors utilizing various sensors that are previously mounted in the vehicle such as temperature sensor for detecting temperature change in the loading room, operation sensor of air conditioner for maintaining the environment in the loading room and opening/closing sensor for the door of loading room or the like and also has a vehicle fault notifying function to transmit a fault condition information to the communication server system via the mobile telephone 30. The vehicle fault notifying function calls, upon detection of a fault in the loading room with various sensors, the communication server system 40 from the mobile telephone 30 of the vehicle 60 via the mobile telephone network to automatically set up the link connection and then transmits the fault condition information (contents detected with various sensors) from the mobile telephone 30 causing the communication server system 40 to automatically receive such information and to detect the fault condition of the vehicle 60. In this case, with the vehicle fault notifying function, the mobile telephone 30 simultaneously transmits the acquired information in the vehicle side, namely various information pieces such as the current position information (latitude and longitude) or the like of the vehicle obtained with the navigation system 10, causing the communication server system 40 to automatically receive such information and also to detect the current position of the fault generating vehicle 60. On the other hand, transfer of fault condition information to a driver is performed with an audio output and also with display of characters or images to a part of the display area 10*c* of the navigation system 10. Temperature change in the loading room through detection of a fault with the fault monitoring means 20 is monitored by automatically setting the range of allowable temperature that may be determined normal depending on the kinds of transportation load included in the previously registered vehicle distribution information, but moreover it is also possible to monitor such temperature change by displaying a list of the kinds of load to the dislay area 10*c* of the navigation system 10 at the time of loading the loads, selectively inputting the kinds of loads to be loaded from a driver or a person in charge of loading work and setting the range of allowable range depending on the selected loads.

The communication server system 40 is a computer that can execute the communication with the navigation system 10 of the vehicle 60 via the mobile telephone network and this computer previously registers, with an input operation of a manager, the vehicle distribution information to effectively progress the transportation works for a plurality of vehicles 60 as the management object and also gives the vehicle distribution instruction to each vehicle 50 by transmission and reception of various data to and from each vehicle 60. The communication server system 30 is provided with a vehicle distribution information file 40*a* for storing the information for vehicle distribution and a vehicle work record information file 40*b* for storing the work record of each vehicle 60. In this communication server system 40, the link connection is set up automatically responding to the call from the mobile telephone 30 of the vehicle 60 having generated a fault in the loading room via the mobile telephone network and thereafter the information acquired in the vehicle side to be transmitted from the side of vehicle 60 is automatically received to detect the fault condition and current position of vehicle 60. Moreover, as the vehicle detecting function, position and condition of each vehicle can be detected by automatically setting up the link connection with a call terminated to the mobile telephone 30 of each vehicle 60 via the mobile telephone network from the side of communication server system 40, instructing the mobile telephone 30 to transmit the information acquired in the side of vehicle, namely the current position information (latitude and longitude) obtained from the navigation system 10 and the vehicle condition information obtained from a driver (loading condition such as loaded condition, vacant condition and loading coefficient or the like) and then receiving the transmitted information and storing this information for each vehicle. Moreover, as the vehicle distribution instruction data transmitting function, the urgent vehicle distribution instruction data, namely the current position data of fault generating vehicle (latitude and longitude), fault condition information of the fault generating vehicle, position information (latitude, longitude) and various information pieces (address, telephone number) of the relaying point and destination transferred from the fault generating vehicle, route information up to the destination, route-added information (conditions such as change of required time for utilizing express-way, traffic conditions in the route) and audio information or the like are transmitted to the vehicle 60 as the alternative vehicle determined based on the various information pieces for each vehicle 60 via the radio communication link. This communication server system 30 can display each information as required on the display area of the display means (not illustrated) of the computer, enabling a manager to recognize the displayed information.

Moreover, the communication server system 40 also has the information to determine whether the fault generating information received from the vehicle side, although not illustrated, may be recovered or not and the information for recovery to be notified to the vehicle when recovery is possible.

For the link connection between the communication server system 40 and vehicle 60 via the mobile telephone network, an interface 50 for predetermined data exchange to execute the mutual conversion between various data and analog signal for telephone line is used, in combination with the mobile telephone 30, between the communication server system 40 and mobile telephone 30 and among the navigation system 10, fault monitoring means 20 and mobile telephone 30. In the conversation between a driver and a manager of communication server system 40, the mobile telephone 30 is used in direct. If a fault is generated in the loading room, the link connection is established to the communication server system 40 from the vehicle 60 to transmit a fault condition information, a manager of communication server system 40 is not required to responding operation to the call and can automatically acquire the fault condition information and can automatically transmit, without waiting for the response of a driver of the alternative vehicle, the additional vehicle distribution information by establishing the link connection with the alternative vehicle from the communication server system 40 to the vehicle 60 to be used as the alternative vehicle. Therefore, even when emergency process is required, information can be exchanged smoothly through the automatic transmission and reception for generation of a fault. Accordingly, quick measure can always be taken with labor saving for generation of a fault and information transmission and reception can be realized at a low cost by eliminating permanent link connecting condition.

Next, the alternative vehicle guiding process in the alternative vehicle guiding system based on the structure explained above will be explained based on the flowcharts of FIG. 2 and FIG. 3.

As a precondition, the vehicle distribution information that is preset based on the load collecting and distributing schedule of the predetermined day is already registered to the navigation system 10 of each vehicle 60, the route guide based on the initial value of the position information of relaying points and destinations is ready and each vehicle 60 is conducting the transportation work depending on the guidance of the navigation system 10. In the communication server system 40, the vehicle distribution information of the vehicle 60 is previously registered to the vehicle distribution information file 40*a*, in the preceding stage of work, together with the intrinsic vehicle information such as a kind of vehicle, loading weight and various mobile apparatuses or the like (refer to FIG. 4). After the transportation work of each vehicle 60 is started, the communication server system 40 calls the mobile telephone 30 of vehicle 60 in every predetermined time to automatically connect the radio link and make access to the mobile telephone 30 of vehicle 60 in order to instruct the navigation system 10 to transmit the information acquired in the vehicle such as the current position information and receive the information transmitted from the navigation system 10 and detect such information as the working situation of the vehicle 60.

In addition, in the running vehicle 60, the mobile telephone 30 of vehicle 60 sets up the link connection with the communication server system 40 each time when the vehicle arrives at or leaves the destinations or relaying points for which the position information is previously registered and transmits such arriving time or departing time together with the information acquired in the vehicle side. The communication server system 40 having received such information records the arriving time and departing time of each vehicle together with the information about loading condition to a vehicle work record information file 40*b* as the vehicle work record (refer to FIG. 5). The communication server system 40 estimates assumed arriving time to the subsequent points (customers) from the transportation work completing condition up to the current time in the work record data (refer to FIG. 5) and compares this assumed arriving time with the scheduled arriving time in the vehicle distribution information registered (refer to FIG. 4). A warning for the delay from the arriving time or the like is displayed as required on the display area together with the transportation work condition list.

When a fault condition such as sudden change of temperature or stop of air-conditioner operation is generated in the loading room of any vehicle 60 and this fault condition is detected with various sensors of a fault monitoring means 20 during the work based on the initial values of vehicle distribution information (step 101), this fault condition is notified with voice or image display to a driver from the fault monitoring means 20 to urge the driver to stop the running of vehicle 60 and also cause the mobile telephone 30 of vehicle 60 to automatically set up the link connection by calling the communication server system 40 through the mobile telephone network (step 102) and transmit the fault condition information obtained with the fault monitoring means 20 and the information acquired in the vehicle side (refer to FIG. 6) including the current position information obtained with the navigation system 10 to the communication sever system 40 (step 103).

The communication server system 40 acquires the information acquired in the vehicle side transmitted through automatic reception thereof (step 104), determines whether a fault condition of the vehicle 60 can be recovered or not based on the information (step 105). When the recovery is possible, the communication server system 40 automatically sets up the link connection by calling the mobile telephone 30 of vehicle 60 and notifies the information for recovery to the navigation system 10 through the mobile telephone 30 (step 106), while the navigation system 10 instructs a driver of vehicle 60 to start the procedures for recovery by automatically extracting the information and displaying it as the character information on the display area 10*c* (step 107) and to continue the transportation work based on the initial value of the vehicle distribution information after the fault is recovered.

If the fault condition of vehicle 60 cannot be recovered, the communication server system 40 acquires, first, the vehicle distribution information instructed to the fault generating vehicle 60, namely the information such as position information of load collecting or distributing points, load information like kind and amount of load and restricting condition for loading or the like as the information to instruct the vehicle distribution to the alternative vehicle (step 108), collates such information with the previously registered intrinsic information of each vehicle other than the fault generating vehicle and the information such as loading condition of each vehicle in this timing which can be determined from the initial vehicle distribution information and selects the prospective vehicles satisfying the conditions of the vehicle distribution information of the fault generating vehicle 60 (step 109).

Moreover, the communication server system 40 automatically sets up the link connection for a plurality of prospective vehicles 60 by calling the mobile telephone 30 of vehicle 60 from the communication server system 40 via the mobile telephone network, instructs the mobile telephone 30 to transmit the information acquired in the vehicle side including the current position information of the navigation system 10 and obtains the current position information of the vehicle 60 by receiving such transmitted information (step 110).

Here, the vehicles 60 that are running the area near the fault generating vehicle or running to become close to such fault generating vehicle are all detected by referring to the current position information of vehicle 60 and referring to the initial value of the position information of the relaying points and destinations of previously registered vehicles 60 (step 111). Here, the simulation for searching the route up to the final destination passing the fault generating vehicle position, remaining relaying points based on the initial vehicle distribution information of each vehicle, non-passing relaying points and destination assigned to the fault generating vehicle from the current position of each vehicle is executed to guide the shortest guiding route of respective vehicles as illustrated in FIG. 17 (step 112). A vehicle that can realize the route to go to all load collecting and distributing points with the shortest time without large deviation from the route based on the initial value is selected from the vehicles 60 in the guided route and is defined as the vehicle 60 to succeed the works of the fault generating vehicle as the alternative vehicle (step 113).

In FIG. 7, the vehicle No. 3 is defined as the alternative vehicle to succeed the works for the fault generating vehicle No. 4.

Thereafter, the emergency vehicle distribution instruction data including the shortest guiding route information that has been adjusted (refer to FIG. 8) by adding the new relaying points and destinations to the route determined with the initial relaying points and destinations of the vehicle 60 as the alternative vehicle is replaced with the initial value of the vehicle distribution information in the vehicle distribution information file 40*a* of the communication server system 40 (step 114) and simultaneously the communication server system 40 calls the mobile telephone 30 of the vehicle 60 which becomes the alternative vehicle to automatically set. up the link connection to transmit the emergency vehicle distribution instruction data (step 115).

In the vehicle 60 as the alternative vehicle, the navigation system 10 receives and acquires the emergency vehicle distribution instruction data via the mobile telephone 30 (step 116). The navigation system 10 displays the information such as the current position of the fault generating vehicle and route distance up to this position among the automatically fetched emergency vehicle distribution instruction data on the display area 10*c* as the character information (refer to FIG. 9(A)) (step 117), thereafter collates the current position information of the vehicle 60 obtained using the measuring means 10*a* with the map information of the map database lob, displays the map of the current position of the vehicle 60 and predetermined range of the periphery of the current position on the display area 10*c* and simultaneously collates the current position information of the fault generating vehicle in the emergency vehicle distribution instruction data with the map information to display the route up to the fault generating vehicle overlapping on the map of the display area 10*c* (step 118).

Figures 9A, 9B:
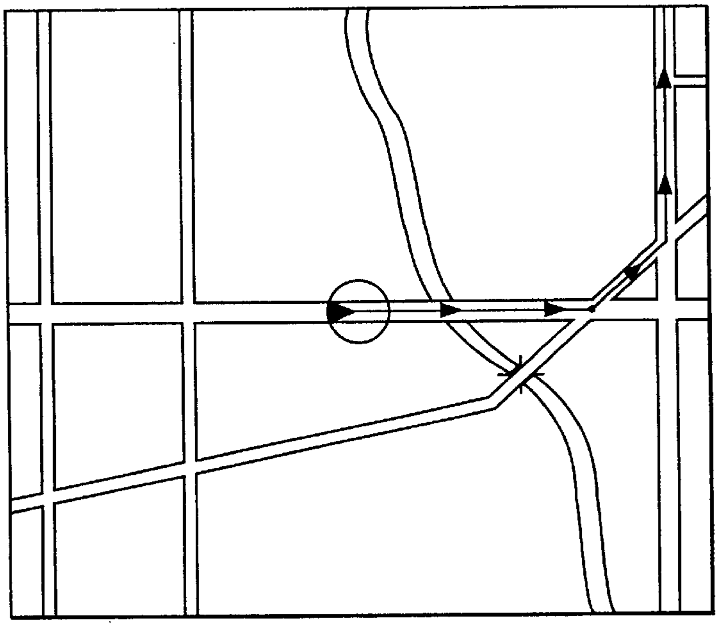
FIG. 9 is a diagram for explaining the character information and map information display condition to the alternative vehicle display area for the urgent vehicle distribution instruction data of an alternative vehicle of the alternative vehicle guiding system as an embodiment of the present invention.

A driver continues the running operation up to the fault generating vehicle position in accordance with the guiding route (refer to FIG. 9(B)) displayed on the display area 10*c*. When the alternative vehicle arrives at the fault generating vehicle position, a driver quickly shifts the loads to complete the transfer work.

Figures 10A, 10B:
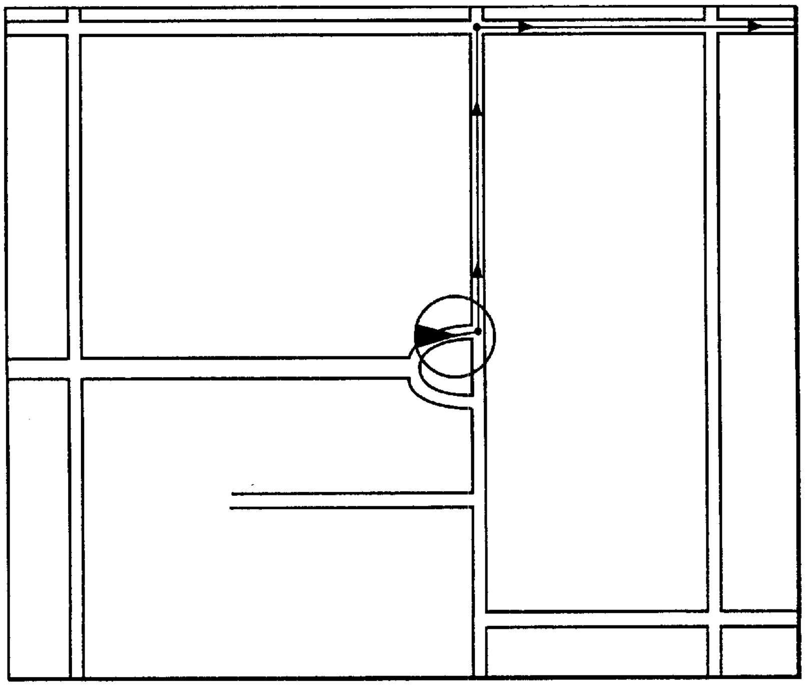
FIG. 10 is a diagram for explaining character information and map information or the like to the alternative vehicle display area for arrival at the fault generating vehicle position of an alternative vehicle in the alternative vehicle guiding system as an embodiment of the present invention.

The navigation system 10 of the alternative vehicle displays first the information such as address, telephone number and route distance or the like of the relaying points and destinations for transportation work as the character information (refer to FIG. 10(A)) on the display area 10*c* from the already fetched emergency vehicle distribution instruction data (step 119), thereafter collates the current position information of vehicle 60 obtained using the measuring means 10*a* with the map information of the map database 10*b*, displays the map of the current position of vehicle 60 and predetermined range in the periphery of the current position on the display area 10*c*, collates the position information of the destinations and relaying points in the emergency vehicle distribution instruction data with the map information and displays the route up to the destinations overlapping on the map of the display area 10*c* (step 120).

A driver continues the running operation up to the destination of the new route in accordance with the guiding route (refer to FIG. 10(B)) displayed on the display area 10*c*. During a series of transfer work, a driver is not required to execute any operation for the navigation system 10 in order to designate the position of the fault generating vehicle and destination or the like.

As explained above, in the alternative vehicle guiding system in relation to this embodiment, the communication server system 40 as the vehicle distribution base to transmit the vehicle distribution information to a plurality of transportation vehicles 60 receives, when a fault is generated in the loading room of any vehicle 60, the fault condition information obtained with the fault monitoring means 20 of the vehicle 60 and the current position information obtained with the navigation system 10, determines, if an alternative vehicle is necessary, a vehicle 60 which satisfies the conditions of work and realizes the optimum route as the alternative vehicle by searching the route passing the fault generating vehicle position and non-passing relaying points and destinations assigned to the fault generating vehicle from the current position of the other vehicles 60 and also determines whether each vehicle satisfies or not the restricting condition in relation to the work assigned to the fault generating vehicle and transmits the optimum route information to the vehicle 60 as the alternative vehicle as the additional information for vehicle distribution. Thereby, since. the navigation system 10 of the alternative vehicle automatically obtains such information and displays the information together with the map of the peripheral area to indicate the new route information up to the destination. Therefore, operations for guiding the alternative vehicle from detection of a fault becomes unnecessary, a series of procedures that a driver notifies generation of fault, a vehicle distribution manager distributes an alternative vehicle and a driver of the alternative vehicle inputs the current position information of the fault generating vehicle to the navigation system can be eliminated, the alternative vehicle can always be distributed smoothly even during the day and night without any manual operation owing to labor saving and moreover the time required until the alternative vehicle arrives can be reduced drastically and quality of loads can surely be maintained. Moreover, even after the alternative vehicle arrives, the input operation by a drive to the navigation system can be eliminated, reducing the work shared on the driver of alternative vehicle and the time required until the works are completely succeeded can also be reduced distinctively and the transportation wok of the alternative vehicle after the transfer of work can be continued smoothly and efficiently. Thereby, the loss due to generation of a fault can be minimized.

In the alternative vehicle guiding system in relation to this embodiment, the position information can be inputted automatically to the navigation system 10 without requiring the input operation of a driver of the alternative vehicle. But, the present invention is not limited thereto and it is also possible introduce the structure that a driver of the alternative vehicle is required to execute the predetermined check operation to notify that the information has arrived at the vehicle 60 to the communication server system 40, for example, to execute the input by voice or simplified terminal operation. Moreover, it is also possible to realize reliable distribution of alternative vehicle by detecting with the communication server system 40 whether a driver of the alternative vehicle has checked the transmitting information or not and repeating, if such information is not yet checked, the transmission of instruction for the predetermined times until the information is checked, and then transmitting, if the response is not returned for predetermined times, the vehicle distribution information to the vehicle that can realize the second suitable route.

Moreover, in the alternative vehicle guiding system in relation to this embodiment, as the information transfer function of the navigation system 10, the information such as fault generating vehicle position, destination and relaying point, telephone number and route distance or the like is displayed on the display area 10*c* as the character information and the route from the current position is displayed on the map of the display area 10*c*, but moreover it is also possible, as the audio information output function, that the information to be displayed as the character information is simultaneously read and outputted as the audio information and the route guidance from the current position is executed by voicing the audio output. Accordingly, understanding of driver can further be enhanced, frequency to watch the display area 10*c* can be reduced and risk of drive can also be reduced. In addition, it is also possible to introduce the structure that the display area 10*c* of the navigation system 10 is divided and operation procedures, current display contents and other information such as emergency message can be displayed with characters or images on the non-displaying display area in parallel with the display of the character information and map information. Therefore, it is no longer required for the other displays to switch the display area of the character information and map information and thereby each information can surely be transferred without giving any bewildering to the driver watching the display area 10*c*.

Moreover, in the alternative vehicle guiding system in relation to this embodiment, the mobile telephone 30 and data exchange interface 50 are provided not only in the vehicle 60 but also in the communication server system, but the present invention is not limited thereto and it is also possible to replace a part of the radio communication link with the subscriber telephone network or ISDN by providing a data exchange apparatus such as a modem or the like to connect the communication server system 40 to the subscriber telephone network or ISDN mutually connected to the mobile telephone network. In this case, communication of vehicle 60 with the mobile telephone 30 can be done stably at a lower cost through the subscriber telephone network or ISDN.

In addition, in the alternative vehicle guiding system in relation to this embodiment, when an alternative vehicle moves to the fault generating vehicle position, the information such as the fault generating vehicle position is displayed with characters or images on the display area 10*c* of the navigation system 10 of the vehicle 60 as the alternative vehicle, but it is also possible, in this case, that the fault condition information sent from the fault monitoring means 20 can be displayed on the display area 10*c* of the navigation system 10 not only in the alternative vehicle but also in the fault generating vehicle and moreover the information of the other vehicle coming up as the alternative vehicle and the estimated arriving time or the like can be displayed as the character information on the display area 10*c* by receiving such information from the communication server system 40. Thereby, high quality of the loads can surely be maintained by instructing the driver of the fault generating vehicle to take preparation for transfer of transportation work and to quickly execute the transfer after the alternative vehicle has arrived.

INDUSTRIAL APPLICABILITY FOR UTILIZATION

As explained above, the present invention allocates, in respective vehicles, a navigation system for obtaining the current position of vehicle and displaying the position together with the map of the peripheral area, a fault monitoring means for detecting a fault condition in the loading room and notifying a fault to a driver and a vehicle communication means for receiving information from external side and transmitting the current position information obtained from the navigation system when a fault is generated and a fault condition information obtained from the fault monitoring means, whereby when the vehicle communication means receives the position information including relaying point and destination from external side, the navigation system automatically acquires each information and displays a new route information up to the destination, resulting in the effects that a driver can smoothly run the vehicle to the destination and if a fault is generated in the loading room, a driver can quickly detect a fault condition in the loading room and take a proper measure immediately.

Moreover, according to the present invention, the communication server system as the vehicle distribution base to transmit the vehicle distribution information to a plurality of vehicles receives, if a fault is generated in the loading room of a certain vehicle, a fault condition information from this vehicle, determines an alternative vehicle from the other vehicles when it is determined that an alternative vehicle is required and transmits, as the additional information, the fault generating vehicle position and subsequent relaying point and destination after the fault generating vehicle position assigned to the fault generating vehicle to the vehicle selected as the alternative vehicle, whereby procedures for distribution of alternative vehicle by the vehicle distribution manager can be saved and the alternative vehicle can be distributed smoothly, resulting in the effect that the time required until arrival of the alternative vehicle can be shortened and adverse effect on the loads can be minimized.

Moreover, according to the present invention, a navigation system for acquiring the current position of vehicle and displaying this information together with the map of the peripheral area, a fault monitoring means for detecting a fault condition in the loading room of vehicle and notifying the fault condition to a driver and a vehicle communication means for receiving information from external side and also transmitting, when a fault is generated, the current position information obtained from the navigation system and the fault condition information obtained from the fault monitoring means are respectively provided in a plurality of transportation vehicles and a communication server system is also provided as the vehicle distribution base to transmit the vehicle distribution information to each vehicle, whereby the communication server system receives a fault condition information from the vehicle if a fault is generated in the loading room of a certain vehicle, determines an alternative vehicle from another vehicle or a plurality of vehicles when it is determined that an alternative vehicle is required, transmits the current position of the fault generating vehicle and subsequent relaying point and destination after the fault generating vehicle position assigned to the fault generating vehicle to the vehicle selected as the alternative vehicle as the additional information and the navigation system of the alternative vehicle automatically receives such information and displays the new route information up to the destination, resulting in the effects that procedures for notifying the fault condition with a driver, distributing the alternative vehicle with the vehicle distribution manager and inputting the current position information of the fault generating vehicle to the navigation system with a driver of the alternative vehicle can be saved, time required until arriving of alternative vehicle can be shortened, adverse effect on the loads can be prevented, labor for notifying a fault and guiding an alternative vehicle can be saved and the alternative vehicle can always be distributed smoothly even in night and day without manual operations and moreover resulting in the effects that the sharing on the driver of alternative vehicle can be reduced by eliminating input operation to the navigation system with a driver even after the alternative vehicle has arrived and the influence on the successive transportation works can be reduced by remarkably shorting the time required until the transportation work is transferred perfectly to the alternative vehicle side.

Moreover, according to the present invention, if a fault condition information is inputted suddenly to the communication server system, this communication server system searches the route, from the current positions of a plurality of vehicles, passing the fault generating vehicle position and not-passing relaying point and destination assigned to the fault generating vehicle, selects the vehicle that can realize the optimum route and transmits the additional position information to this vehicle, whereby resulting in the effects that a vehicle that can pass the fault generating vehicle position and remaining relaying point and destination without large deviation from the route based on the initial value can be selected within a short period of time even if a fault is generated in a certain vehicle, quality of loads can surely maintained by distributing the alternative vehicle to the fault generating position within a short period of time, the transportation work of the alternative vehicle after the transfer of work can be continued smoothly and effectively and loss due to generation of a fault can also be minimized.

Moreover, according to the present invention, the communication server system searches, for generation of a fault in a certain vehicle, a route passing the fault generating vehicle position, not-passing relaying point and destination assigned to the fault generating vehicle from the current positions of a plurality of vehicles, determines whether each vehicle satisfies or not the restriction condition in relation to the work assigned to the fault generating vehicle and selects the vehicle that satisfies the conditions of work and realize the optimum route in order to transmit the additional information to such selected vehicle, whereby resulting in the effects that if a fault is generated in a certain vehicle, the work can be transferred by selecting the vehicle that is most suitable for transfer of work from the fault generating vehicle to effectively execute such work, the transportation work of the alternative vehicle after the transfer of work can be continued smoothly and effectively and loss due to generation of fault can be minimized.

Moreover, according to the present invention, the mobile telephone network is used as the radio communication link and the fault condition information can be transmitted, if a fault is generated, by opening the communication link from the vehicle to the communication server system and the communication server system transmits, to the alternative vehicle, the additional vehicle distribution information by opening the communication link to the alternative vehicle in order to acquire the transmitted fault condition information, if a fault is generated, without any operation to send a response to the call from a manager and to transmit the vehicle distribution information without waiting for response from a driver of the alternative vehicle, whereby resulting in the effects that information can be exchanged smoothly even in case urgent procedures may be required by executing automatic transmission and reception of information if a fault is generated, labor saving can be realized to make easier the management even when a proper measure can always be taken for the fault condition, and the necessary information can be transmitted and received when it is required and thereby communication cost can be lowered even when the communication link is not always in the connected condition.

Moreover, according to the present invention, the current position information is transmitted any time required to the communication server system from the navigation system and the communication server system can accurately detect the position of each vehicle by acquiring the current position information from each vehicle, whereby resulting in the effects that if an alternative vehicle is necessary, the communication server system can accurately identify the position of each running vehicle based on the current position information, a vehicle that can most effectively execute the movement to the fault generating vehicle position and the transfer of transportation work from such fault generating vehicle can be selected correctly as the alternative vehicle and quality of loads can be realized and the smooth transportation work after the transfer of work can also be continued.

What is claimed is:

1. A mobile vehicle guiding apparatus, comprising:

a navigation system including measuring means for obtaining a current vehicle position information, a map database storing map information and a display displaying characters and video information for visual recognition by a driver of the vehicle to collate the current vehicle position information obtained by said measuring means with the map information of said map database thereby to display the current position of the vehicle on said display together with a map of a peripheral area relative to the current vehicle position;

fault monitoring means for detecting information of a fault condition in the vehicle and notifying the fault condition information to the driver with an audio message and/or by a predetermined display that is visually recognizable by the driver; and vehicle communication means for receiving information transmitted to the vehicle from an external side through a radio communication link and for transmitting, at least when a fault condition is detected, the information detected in the vehicle side, including current vehicle position information obtained by the measuring means of said navigation system and said vehicle fault condition information detected by said fault monitoring means, to the external side through the radio communication link, wherein the position information of at least a vehicle destination received by said vehicle communication means is collated with the map information of said map database and route information to the vehicle destination from the current vehicle position is displayed on said display area.

2. A communication server system to issue work instructions by transmitting a position information of relaying point and destination for transportation work to vehicle communication means of each vehicle through the radio communication link among a plurality of vehicles for transportation work based on a preset vehicle distribution information, wherein the position information of relaying point and destination for transportation work based on the vehicle distribution information is transmitted as the initial value to a plurality of vehicles, thereafter the information acquired in the vehicle side including a fault condition information from a certain vehicle is suddenly received, if it is determined by fault monitoring means that said vehicle cannot eliminate the fault condition, a relevant fault generating vehicle position and the relaying point and destination at which the fault generating vehicle does not yet arrive assigned to the fault generating vehicle are additionally assigned as the relaying point and/or destination of another predetermined vehicle and the added position information of relaying point and/or destination is transmitted to the vehicle communication means of said predetermined vehicle via the radio communication link.

3. An alternative vehicle guiding system comprising:

in each of a plurality of vehicles for transportation work, a mobile vehicle guiding apparatus, comprising:

a navigation system including measuring means for obtaining a current vehicle position information, a map database storing map information and a display to display characters and video information for visual recognition by a driver of the vehicle to collate the current vehicle position information obtained by said measuring means with the map information of said map database thereby to display the current position of the vehicle on said display together with a map of a peripheral area relative to the current vehicle position;

fault monitoring means for detecting information of a fault condition in the vehicle and notifying the fault condition information to the driver with an audio message and/or by a predetermined display that is visually recognizable by the driver; and vehicle communication means for receiving information transmitted to the vehicle from an external side through a radio communication link and to transmit, at least when a fault condition is detected, the information detected in the vehicle side, including current vehicle position information obtained by the measuring means of said navigation system and said vehicle fault condition information detected by said fault monitoring means, to the external side through the radio communication link, wherein the position information of at least a vehicle destination received by said vehicle communication means is collated with the map information of said map database and route information to the vehicle destination from the current vehicle position is displayed on said display area; and a communication server system issuing work instructions by transmitting a position information of relaying point and destination for transportation work to the vehicle communication means of each vehicle through the radio communication link among a plurality of vehicles for transportation work based on a preset vehicle distribution information, wherein the position information of relaying point and destination for transportation work based on the vehicle distribution information is transmitted as the initial value to a plurality of vehicles, thereafter the information acquired in the vehicle side including a fault condition information from a certain vehicle is suddenly received, if it is determined that said vehicle cannot eliminate the fault condition, a relevant fault generating vehicle position and the relaying point and destination at which the fault generating vehicle does not yet arrive assigned to the fault generating vehicle are additionally assigned as the relaying point and/or destination of another predetermined vehicle and the added position information of relaying point and/or destination is transmitted to the vehicle communication means of said predetermined vehicle via the radio communication link, wherein the communication server system receives the information acquired in the vehicle side including the fault condition information transmitted from the vehicle generating a fault condition in its loading room via said radio communication link and transmits the fault generating vehicle position and the position information, assigned to the fault generating vehicle, of the relaying point and destination at which the fault generating vehicle does not arrive to the vehicle communication means of the other predetermined vehicle via the radio communication link, and the navigation system of said predetermined vehicle acquires the position information of relaying point and destination from said communication server system received with said vehicle communication means, collates the relevant position information with the map information of said map database and displays the route information up to the destination from the current position of vehicle on said display area.

4. An alternative vehicle guiding system as claimed in claim 3, wherein said communication server system searches, a fault condition information is suddenly detected from a certain vehicle and a vehicle is requested in place of a fault generating vehicle, the route passing the fault generating vehicle position and the not-passing relaying point and destination assigned to the fault generating vehicle from the current positions of vehicles other than said fault generating vehicle and issues instruction to the predetermined vehicle among a plurality of vehicles which realizes the optimum route to add said fault generating vehicle position and the not-passing relaying point and destination assigned to the fault generating vehicle as the new relaying point and/or destination of said predetermined vehicle.

5. An alternative vehicle guiding system as claimed in claim 4, wherein the optimum route is obtained for the predetermined vehicle which can realize said optimum route by specifying said fault generating vehicle position and the not-passing relaying and destination assigned to the fault generating vehicle as the new points for vehicle to pass in addition to the not-passing relaying point and destination assigned to said vehicle and the information of said optimum route is notified to said predetermined vehicle.

6. An alternative vehicle guiding system as claimed in claim 4, wherein said communication server system searches the route passing the said fault generating vehicle position and not-passing relaying point and destination assigned to said fault generating vehicle from the current positions of vehicles other than said fault generating vehicle and determines whether a plurality of vehicles satisfy or not one or a plurality of restriction conditions in relation to the work assigned to said fault generating vehicle and also issues an instruction to the predetermined vehicle among a plurality of vehicles that satisfies said conditions for work and can realize the optimum route to add said fault generating vehicle position and not-passing relaying point and destination assigned to the fault generating vehicle as the new relaying point and/or destination.

7. An alternative vehicle guiding system as claimed in claim 3, wherein said radio communication link is the mobile telephone network and the mobile telephones are provided as the vehicle communication means of respective vehicles, if a fault is detected in the loading room in a certain vehicle, the mobile telephone of the relevant vehicle calls said communication server system to set up the link connection to automatically transmit the information acquired in the vehicle side including the fault condition information to the communication server system and also sets up the link connection by calling the mobile telephone of an alternative vehicle after said communication server system has determined the alternative vehicle in order to automatically transmit the additional position information of the relaying point and/or destination.

8. An alternative vehicle guiding system as claimed in claim 3, wherein said vehicle communication means transmits the information detected in the vehicle side including at least the current position information of the vehicle obtained with the measuring means of said navigation system and also including, if a fault condition is detected, the fault condition information of the vehicle obtained with said fault monitoring means to the external side as required via the radio communication link and said communication server system is waiting reception of a fault condition information from a certain vehicle while receiving said information detected in the vehicle side, when it is transmitted, from said vehicle communication means via the radio communication link to detect the running condition of each vehicle.

* * * * *